(12) United States Patent
Ozsoylu et al.

(10) Patent No.: US 7,779,717 B2
(45) Date of Patent: Aug. 24, 2010

(54) STEERING COLUMN ASSEMBLY HAVING A STOPPING MEMBER FOR PREVENTING ROTATION OF A TILT MECHANISM

(75) Inventors: Suat A. Ozsoylu, Rochester Hills, MI (US); Adrian Grigoras, Midland, MI (US); Eugene T. Tanke, II, Vasser, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 649 days.

(21) Appl. No.: 11/715,638

(22) Filed: Mar. 8, 2007

(65) Prior Publication Data

US 2008/0217900 A1 Sep. 11, 2008

(51) Int. Cl.
*B62D 1/18* (2006.01)
*B62D 1/00* (2006.01)

(52) U.S. Cl. ........................................ 74/493; 280/777

(58) Field of Classification Search ............... 74/492, 74/493, 526; 280/775, 777
See application file for complete search history.

(56) References Cited

U.S. PATENT DOCUMENTS

| | | | |
|---|---|---|---|
| 4,445,708 A * | 5/1984 | Oakes et al. | ........... 280/777 |
| 4,970,910 A | 11/1990 | Cymbal | |
| 5,027,674 A | 7/1991 | Nolte et al. | |
| 5,029,489 A | 7/1991 | Burmeister et al. | |
| 5,144,855 A | 9/1992 | Yamaguchi et al. | |
| 5,566,585 A | 10/1996 | Snell et al. | |
| 6,282,977 B1 * | 9/2001 | Satoh et al. | ........... 74/493 |
| 6,481,310 B2 | 11/2002 | Janeczko et al. | |
| 6,591,709 B1 | 7/2003 | Kim et al. | |
| 6,851,712 B2 | 2/2005 | Park et al. | |
| 6,986,531 B2 | 1/2006 | Ohtsu et al. | |
| 7,052,043 B2 | 5/2006 | Lee | |
| 7,083,198 B2 | 8/2006 | Lee | |

FOREIGN PATENT DOCUMENTS

JP 62074765 A * 4/1987

* cited by examiner

*Primary Examiner*—Thomas R Hannon
*Assistant Examiner*—Phillip A Johnson
(74) *Attorney, Agent, or Firm*—Cantor Colburn LLP (57) ABSTRACT

A steering column assembly and method of preventing rotation of a tilt mechanism relative to a steering column during application of a predetermined force is disclosed. The tilt mechanism is coupled to the steering column and includes a tilt head pivotable about a tilt axis with a lever and a moveable shoe pivotally mounted to the tilt head respectively. The moveable shoe pivots between an engaged position for preventing rotation of the tilt head and a disengaged position for allowing rotation of the tilt head. A stopping member is coupled to at least one of the lever and the tilt head for deforming at least one of the tilt and the lever to maintain the moveable shoe in the engaged position and to prevent the tilt head from pivoting about the tilt axis upon a predetermined force applied to the steering column.

14 Claims, 12 Drawing Sheets

STEERING COLUMN ASSEMBLY HAVING A STOPPING MEMBER FOR PREVENTING ROTATION OF A TILT MECHANISM

BACKGROUND OF THE INVENTION

1. Field of the Invention

The present invention relates to a steering column assembly for a vehicle, more specifically to a tilt mechanism of a steering column and a method of preventing rotation of the tilt mechanism.

2. Description of the Prior Art

Vehicles can be equipped with a steering column assembly that adjusts the position of a steering wheel to enhance the comfort and safety of the driver. For example, the steering column assembly can provide tilting movement to tilt the steering wheel relative to other components of the steering column to provide greater access to getting into and out of the driver's seat of the vehicle. The steering column assembly often includes an outer jacket having a support defining a tilt axis. A tilt head is mounted to the support with the tilt head supporting a lever that pivots and a movable shoe. The movable shoe abuts the lever and pivots between an engaged position engaging the support for preventing rotation of the tilt head and a disengaged position spaced from the support for allowing rotation of the tilt head. However, upon a predetermined force applied to the steering wheel during a collision, the lever has a tendency to rotate which allows the moveable shoe to rotate to the disengaged position thus allowing the steering wheel to change position at an inconvenient time.

Therefore, there remains a need to develop a tilt mechanism that provides the desired adjustment while also preventing a steering wheel from changing position during a collision.

SUMMARY OF THE INVENTION AND ADVANTAGES

The present invention provides for a steering column assembly including an outer jacket having a support defining a tilt axis with an upper shaft coupled to the outer jacket. A tilt mechanism is coupled to a steering column and includes a tilt head pivotally mounted to the support about the tilt axis and mounted to the upper shaft for coupling the upper shaft to the outer jacket. A lever is pivotally mounted to the tilt head about a pivot axis and a moveable shoe is pivotally mounted to the tilt head about a shoe axis. The moveable shoe abuts the lever such that rotation of the lever about the pivot axis facilitates rotation of the moveable shoe about the shoe axis between an engaged position engaging the support for preventing rotation of the tilt head and a disengaged position spaced from the support for allowing rotation of the tilt head. A stopping member is coupled to at least one of the lever and the tilt head for deforming at least one of the tilt head and the lever to maintain the moveable shoe in the engaged position and to prevent the tilt head from pivoting about the tilt axis upon a predetermined force applied to the upper shaft.

The subject invention also provides a method of preventing rotation of a tilt mechanism relative to a steering column during application of a predetermined force. The tilt mechanism includes a tilt head, a lever, and a moveable shoe pivotally mounted to the tilt head with a stopping member coupled to at least one of the lever and the tilt head. The method includes the steps of applying an impact force to the tilt head and the moveable shoe with the moveable shoe urging the lever to an unlocked position. The method further includes the step of engaging the lever with the stopping member and applying a reactive force to the impact force through the stopping member by the stopping member deforming at least one of the tilt head and the lever for preventing rotation of the lever to the unlocked position.

The present invention therefore provides for a tilt mechanism having a stopping member for maintaining a moveable shoe in an engaged position and to prevent a tilt head from pivoting about a tilt axis upon a predetermined force applied to an upper shaft. In addition, the stopping member is easily added to the already existing components of the tilt mechanism thus preventing expensive redesign of the tilt mechanism.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, a steering column assembly 20 for a vehicle (not shown) is generally shown in FIGS. 1-4.

The steering column assembly 20 includes a steering column having an outer jacket 22 and an upper shaft 30 with the outer jacket 22 having a support 24 defining a tilt axis T. The support 24 includes a pair of arms 26 spaced from each other and extending transverse the tilt axis T. The support 24 includes a rack of teeth 28 spaced from the tilt axis T and mounted to the support 24. Preferably the rack of teeth 28 is inclined on the support 24 and fixed to the support 24 to prevent movement of the rack of teeth 28. An upper shaft 30 is coupled to the outer jacket 22 for receiving a steering wheel (not shown). A lower shaft 32 is at least partially disposed in the outer jacket 22 and coupled to the upper shaft 30. A joint 34 is disposed between the upper shaft 30 and the lower shaft 32 for coupling the upper shaft 30 to the lower shaft 32 and for allowing the upper shaft 30 to rotate about the tilt axis T.

The steering column assembly 20 also includes a tilt mechanism 36 for providing tilting movement to the steering wheel to enhance the comfort and safety of a user. The steering column includes the outer jacket 22, the support 24, the upper shaft 30, the lower shaft 32 and the joint 34 as discussed above. It is to be appreciated that the steering column may include other components as known to those skilled in the art. The tilt mechanism 36 includes a tilt head 38 adapted to be pivotally mounted to the steering column for rotation about the tilt axis T. More specifically, the tilt head 38 is pivotally mounted to the support 24 about the tilt axis T and mounted to the upper shaft 30 for coupling the upper shaft 30 to the outer jacket 22. Preferably, the tilt head 38 is coupled to the arms 26 of the support 24. The tilt head 38 includes a first surface 40 with a bracket 42 adjacent the first surface 40. The bracket 42 is integrally formed with the tilt head 38 and will be discussed in detail below.

Figure 5:
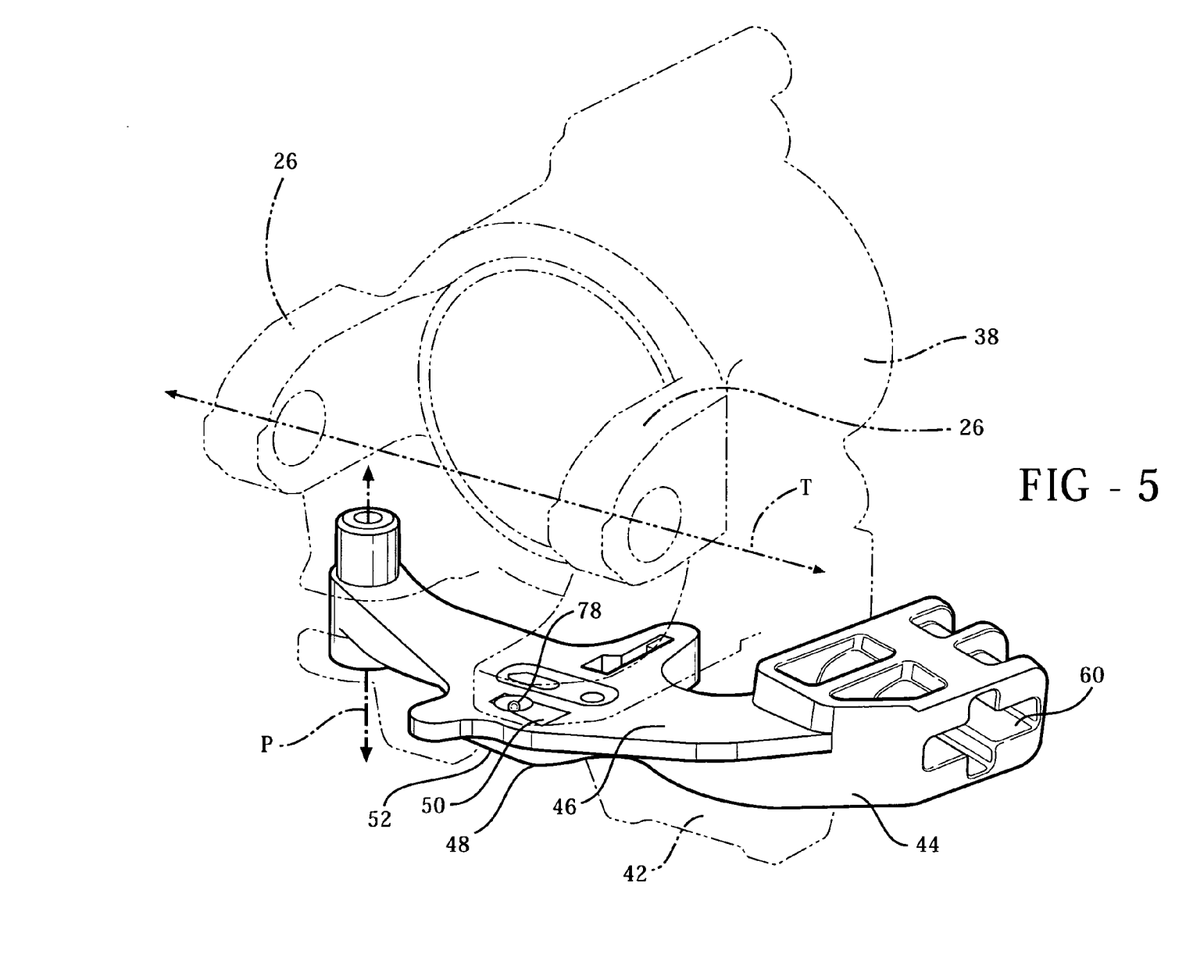
FIG. 5 is a perspective view of the lever with the tilt head shown in phantom.

As also shown in FIG. 5, a lever 44 is pivotally mounted to the tilt head 38 about a pivot axis P. The lever 44 includes a top side 46 and a bottom side 48 opposing one another with the first surface 40 adjacent the top side 46. An insert 50 may be disposed on the lever 44 as known in the art. The insert 50 may be coupled to at least one of the top side 46 and the bottom side 48 of the lever 44. However it is to be appreciated that the insert 50 may be disposed on the lever 44 or the tilt head 38. The lever 44 includes a wedge surface 52 disposed on the bottom side 48 of the lever 44 and will be discussed below. As best shown in FIGS. 2, 3, 5 and 6, the lever 44 rotates about the pivot axis P between a locked position 54 for preventing rotation of the tilt head 38 and an unlocked position 56 for allowing rotation of the tilt head 38. The top side 46 and the first surface 40 complement each other to allow the lever 44 to pivot freely between the locked position 54 and the unlocked position 56. More specifically, the top side 46 of the lever 44 and the first surface 40 of the tilt head 38 are spaced from each other to define a gap 58 for allowing the lever 44 to pivot freely between the locked position 54 and the unlocked position 56.

Figure 1:
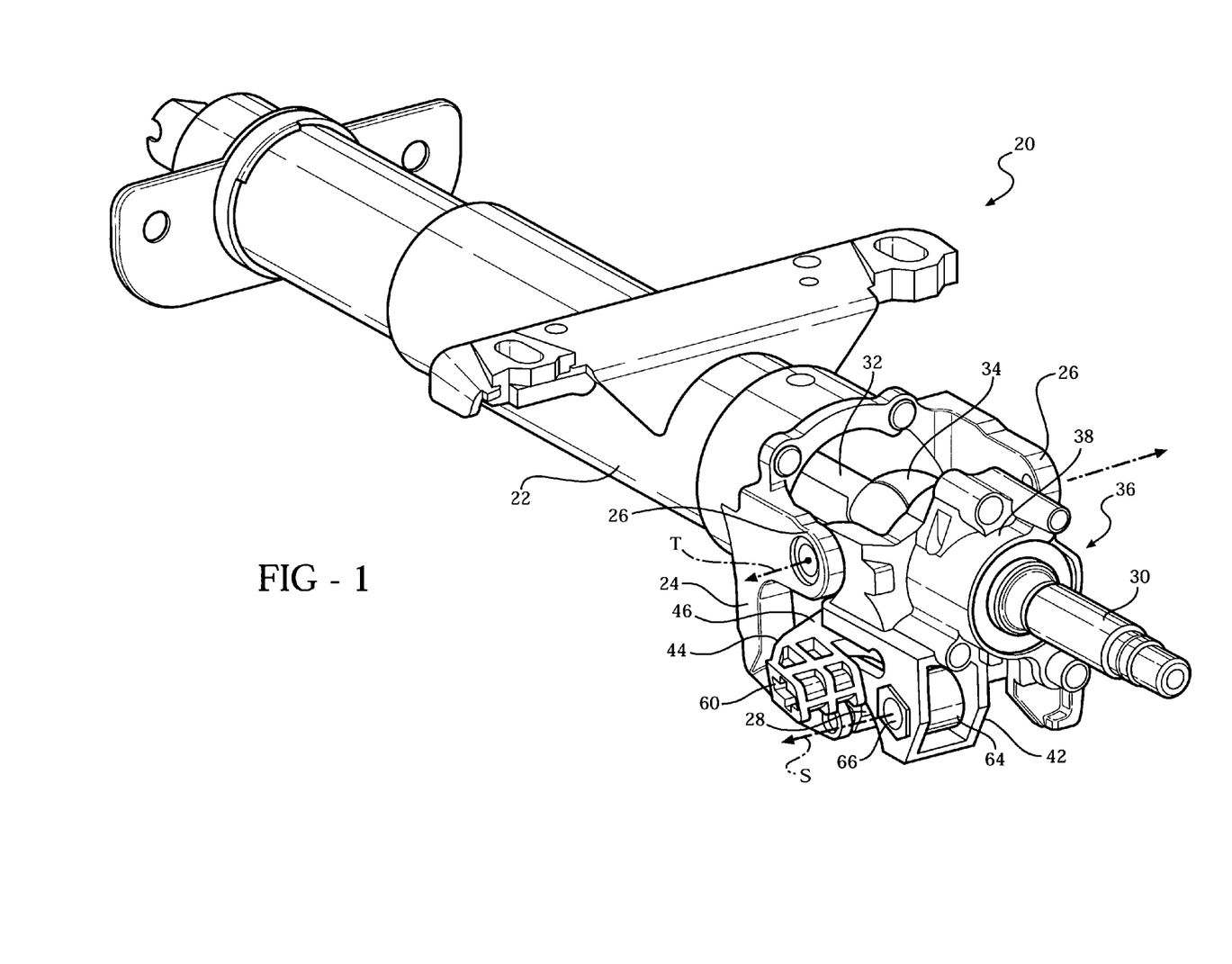
FIG. 1 is a perspective view of a steering column assembly in accordance with the subject invention.
Figure 2:
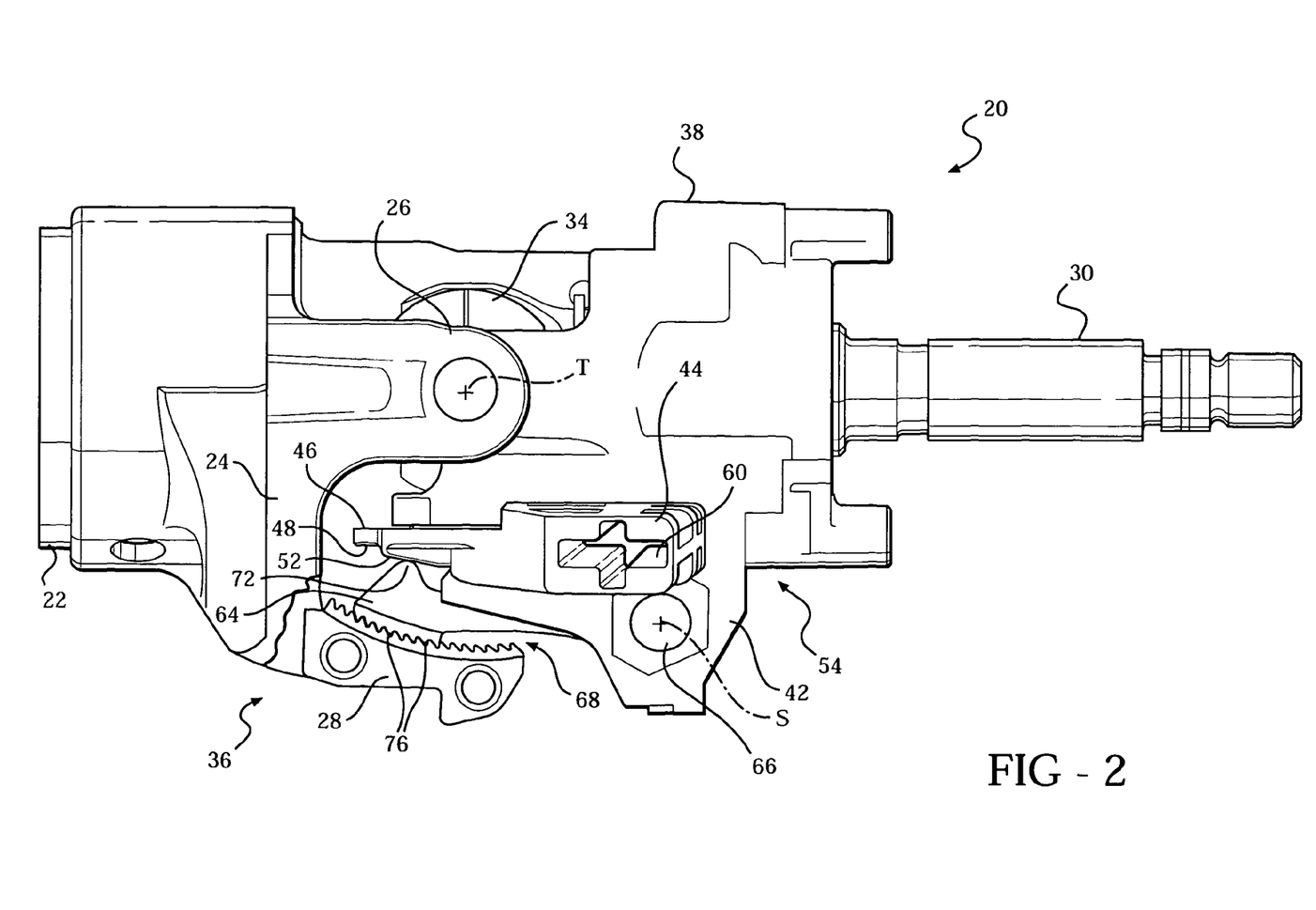
FIG. 2 is a partial fragmented side view of the steering column assembly showing a moveable shoe in an engaged position for preventing rotation of a tilt head.
Figure 3:
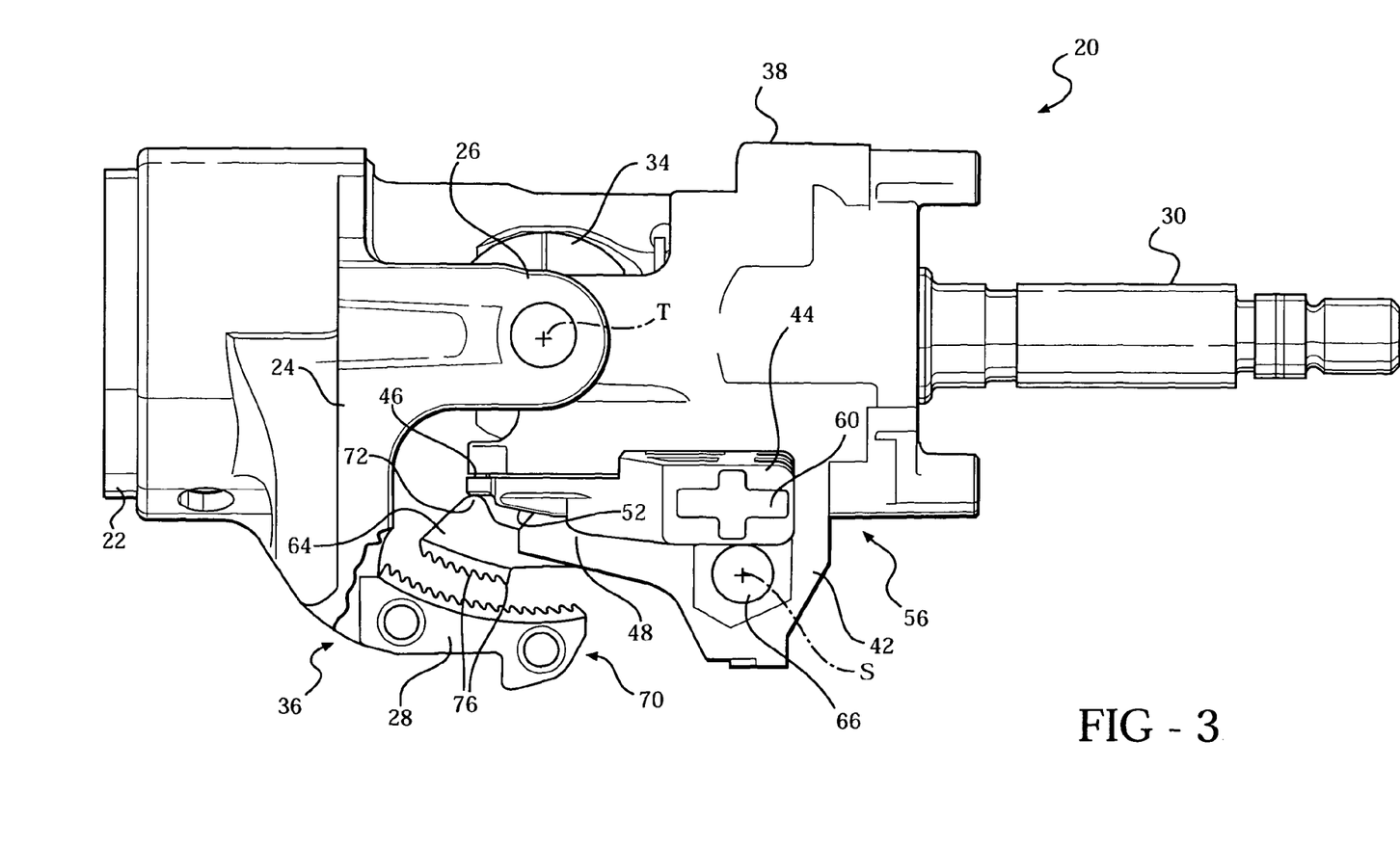
FIG. 3 is a partial fragmented side view of the steering column assembly showing the moveable shoe in a disengaged position for allowing rotation of the tilt head.
Figure 4:
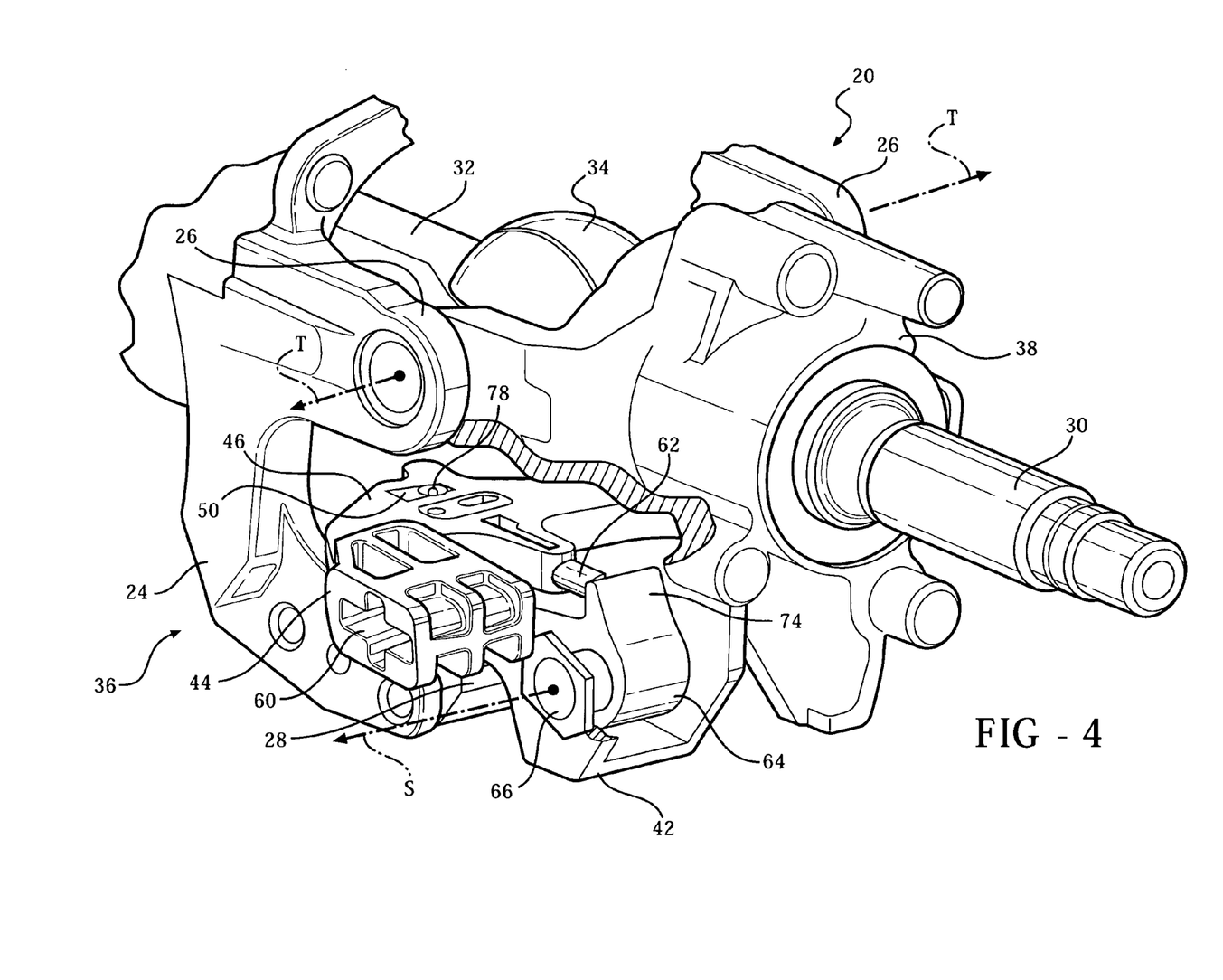
FIG. 4 is a partial fragmented perspective view of the steering column assembly showing a top side of a lever.

The lever 44 further defines a passage 60 for receiving a handle (not shown). The user of the vehicle moves the handle which rotates the lever 44 between the locked position 54 and the unlocked position 56 for adjusting the tilt position of the steering wheel. Referring to FIG. 4, the lever 44 also defines a bore (not shown) extending transverse the pivot axis P for receiving a force pin 62 and a compression spring (not shown). The compression spring continuously biases the lever 44 to the locked position 54. It is to be appreciated that at least one additional spring may be used to bias the lever 44 to the locked position 54. Force pins and compression springs are well known in the art and will not be further discussed.

Referring back to FIGS. 1-4, a moveable shoe 64 is pivotally mounted to the tilt head 38 about a shoe axis S. More specifically, the moveable shoe 64 is coupled to the bracket 42 of the tilt head 38 such that the bracket 42 supports the moveable shoe 64. Preferably, the pivot axis P is transverse the shoe axis S. A rod 66 is disposed through the moveable shoe 64 along the shoe axis S and attached to the bracket 42 for securing the moveable shoe 64 to the bracket 42 and for allowing the moveable shoe 64 to pivot about the shoe axis S. The moveable shoe 64 abuts the lever 44 such that rotation of the lever 44 about the pivot axis P facilitates rotation of the moveable shoe 64 about the shoe axis S between an engaged position 68 engaging the steering column for preventing rotation of the tilt head 38 and a disengaged position 70 spaced from the steering column for allowing rotation of the tilt head 38. More specifically, the moveable shoe 64 abuts the lever 44 such that rotation of the lever 44 about the pivot axis P facilitates rotation of the moveable shoe 64 about the shoe axis S between the engaged position 68 engaging the support 24 for preventing rotation of the tilt head 38 and the disengaged position 70 spaced from the support 24 for allowing rotation of the tilt head 38. Preferably, the moveable shoe 64 abuts the wedge surface 52 of the lever 44 such that the lever 44 rotates about the pivot axis P between the locked position 54 and the unlocked position 56 allows the moveable shoe 64 to pivot about the shoe axis S while moving along the wedge surface 52 between the engaged position 68 preventing rotation of the tilt head 38 and the disengaged position 70 allowing rotation of the tilt head 38.

The moveable shoe 64 includes a cam lobe 72 abutting the wedge surface 52. A stop arm 74 is disposed on the moveable shoe 64 and spaced from the cam lobe 72. The stop arm 74 extends transverse the shoe axis S. The force pin 62 abuts the stop arm 74 and continuously applies a force to the stop arm 74 through the compression spring which causes the moveable shoe to continuously bias toward the unlocked position 56. In other words, the compression spring continuously biases the lever 44 toward the locked position 54 and continuously biases the force pin 62 into contact with the stop arm 74 which continuously biases the movable shoe 64 toward the unlocked position 56, thus causing the cam lobe 72 of the movable shoe 64 to be in continuous contact with the wedge surface 52 of the lever 44. Therefore, when the lever 44 rotates from the locked position 54 to the unlocked position 56, the force pin 62 allows the stop arm 74 to rotate the moveable shoe 64 away from the rack of teeth 28 while the cam lobe 72 moves along the wedge surface 52. Stop arms are well known in the art and will not be discussed further.

The moveable shoe 64 further includes a plurality of teeth 76 opposing the cam lobe 72 for selectively engaging the support 24 to prevent rotation of the tilt head 38 and disengaging the support 24 to allow rotation of the tilt head 38. More specifically, the teeth 76 of the moveable shoe 64 cooperate with the rack of teeth 28 of the support 24 for selectively engaging one another to prevent rotation of the tilt head 38 and disengaging one another to allow rotation of the tilt head 38.

Preferably, the stop arm 74, the cam lobe 72, and the teeth 76 are integral with the moveable shoe 64. However it is to be appreciated that the stop arm 74, the cam lobe 72, and the teeth 76 may be coupled to the moveable shoe 64 in any way known to those skilled in the art. The moveable shoe 64 may be formed of a powdered metal and/or a carbon steel. However it is to be appreciated that the moveable shoe 64 may be formed of any other material or materials.

Referring to FIGS. 4-7, a first embodiment of a stopping member 78 is shown. In this embodiment, the stopping member 78 is coupled to the lever 44 for deforming the tilt head 38. As will be illustrated below with regards to other embodiments, the stopping member 78 may be coupled to the tilt head 38 for deforming the lever 44. More specifically, the stopping member 78 of the first embodiment is coupled to the top side 46 of the lever 44 for deforming the first surface 40 of the tilt head 38. In other words, the lever 44 defines a recess 82 and the stopping member 78 is disposed in the recess 82. The recess 82 of the lever 44 includes an inner surface 84 with a predetermined width for receiving the stopping member 78 and the stopping member 78 includes an outer surface 80 defining a thickness. The width of the recess 82 is larger than the thickness of the stopping member 78 for allowing a single point of contact between the recess 82 and the stopping member 78. As discussed in greater detail below, the stopping member 78 may be configured as a ball, a pin, or any other acceptable configuration for preventing rotation of the lever 44 upon a predetermined force applied to the upper shaft 30.

Figure 8:
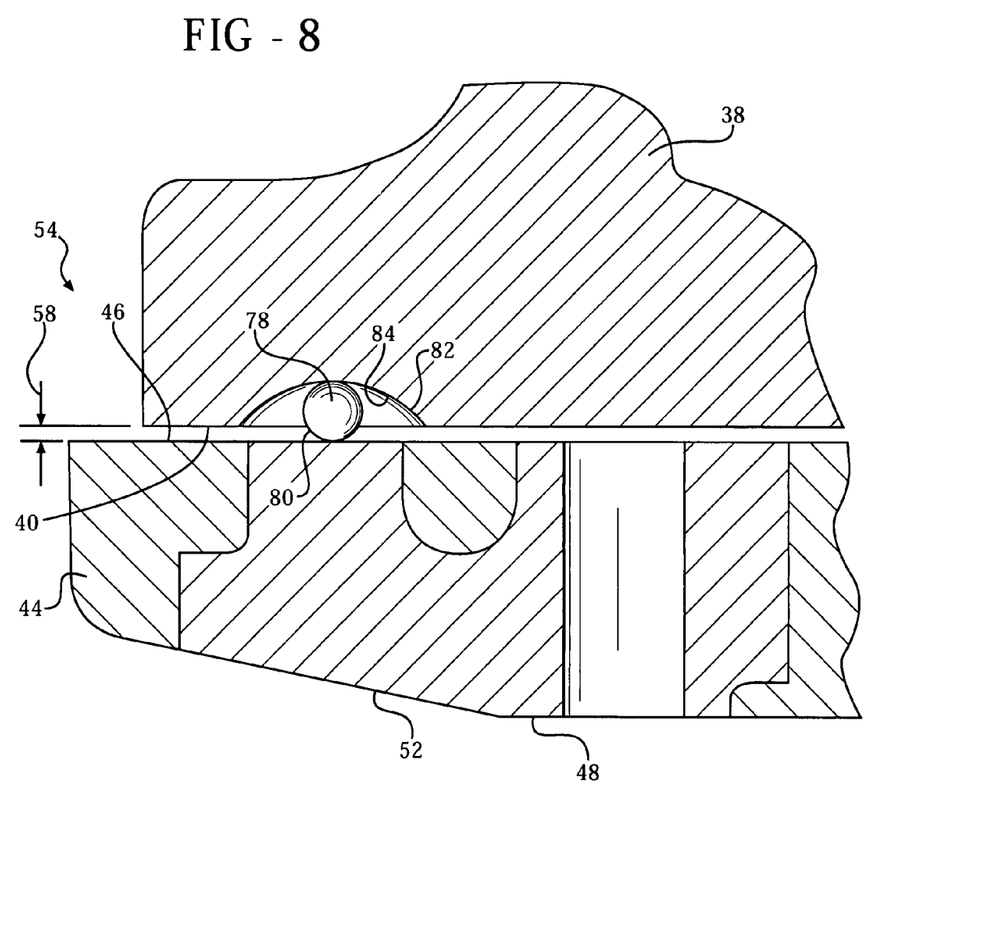
FIG. 8 is a fragmented cross-sectional side view of the tilt head and the lever of a second embodiment with tilt head defining the recess with the stopping member disposed in the recess before the collision.
Figure 10:
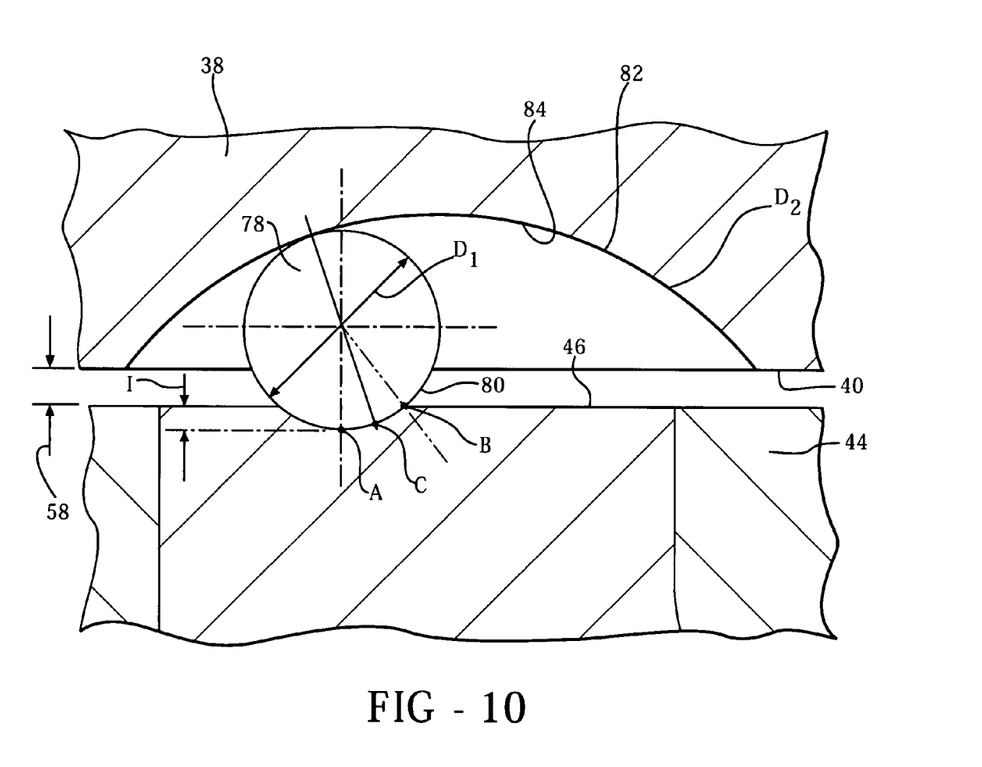
FIG. 10 is an enlarged fragmented cross-sectional view of the tilt head, lever, and stopping member of FIG. 8 after the collision.

FIGS. 8 and 10, a second embodiment of the stopping member 78 is shown. In this embodiment, the tilt head 38 defines the recess 82. More specifically, the first surface 40 of the tilt head 38 defines the recess 82 for deforming the top side 46 of the lever 44. The recess 82 of the tilt head 38 includes the inner surface 84 with the predetermined width for receiving the stopping member 78. The width of the recess 82 is larger than the thickness of the stopping member 78 for allowing a single point of contact between the recess 82 and the stopping member 78. However it is to be appreciated that the stopping member 78 could be in any other suitable configuration, such as the stopping member 78 may be coupled to the bottom side 48 of the lever 44 for deforming the cam lobe 72 of the moveable shoe 64. It is also to be appreciated that the stopping member 78 may be coupled to other components of the tilt mechanism 36. In addition, it is to be further appreciated that more than one stopping member 78 may be used to prevent the lever 44 from rotating to the unlocked position 56 during a collision. Therefore, more than one recess 82 may be disposed in at least one of the lever 44 and the tilt head 38 for accommodating more than one stopping member 78.

The stopping member 78 is therefore coupled to at least one of the lever 44 and the tilt head 38 for deforming at least one of the tilt head 38 and the lever 44 to maintain the moveable shoe 64 in the engaged position 68 and to prevent the tilt head 38 from pivoting about the tilt axis T upon the predetermined force applied to the steering column and more specifically to the upper shaft 30. As set forth above, at least one of the lever 44 and the tilt head 38 defines the recess 82 having the inner surface 84 with the predetermined width for receiving the stopping member 78. The single point of contact between the inner surface 84 and the stopping member 78 allows the stopping member 78 to deform at least one of the lever 44 and the tilt head 38 by indenting, dimpling, or pivoting at least one of the lever 44 and the tilt head 38 to maintain the movable shoe 64 in the engaged position 68 and to prevent the tilt head 38 from pivoting about the tilt axis T upon the predetermined force applied to the steering column. Meaning when the stopping member 78 indents, dimples, or divots the material of at least one of the lever 44 and the tilt head 38, no groove is formed in the material. As shown in FIG. 10, the amount of material deformed or dimpled by the stopping member 78 is defined by the following equation:

$$I = \frac{D_1}{2}(1 - \cos\theta)$$

where I is the depth that the stopping member 78 indents into the lever 44, $D_1$ is an outer diameter of the stopping member 78, and $\theta$ is an angle between point A and point B. The angle $\theta$ may be any angle between point A and point B to define a point C on the lever 44, which in turn creates the single point of contact for the stopping member 78 on the tilt head 38. The angle $\theta$ cannot be greater than point A and cannot include point B because the stopping member 78 would then create a groove in the lever 44 and allow the lever 44 to undesirably pivot to the unlocked position 56. In the preferred embodiment, the angle $\theta$ extends between −90 degrees and −52 degrees as measured from FIG. 10. In the more preferred embodiment, the angle $\theta$ extends between −90 degrees and −59 degrees. The most preferred angle is ½ of the angle $\theta$ between −90 degrees and −59 degrees, which is −74.5 degrees.

The stopping member 78 is further defined as having a circular shape with a constant outer diameter $D_1$. The outer diameter $D_1$ of the stopping member 78 may be any diameter and preferably falls within the outer diameters $D_1$ represented on the graph in FIG. 9, which will be discussed in detail below. In the embodiment illustrated, the outer diameter $D_1$ of the stopping member 78 is 1.5 mm. Using the above equation with a $D_1$ of 1.5 mm and a $\theta$ of −74.5 degrees, the indentation is 0.55 mm.

Figure 9:
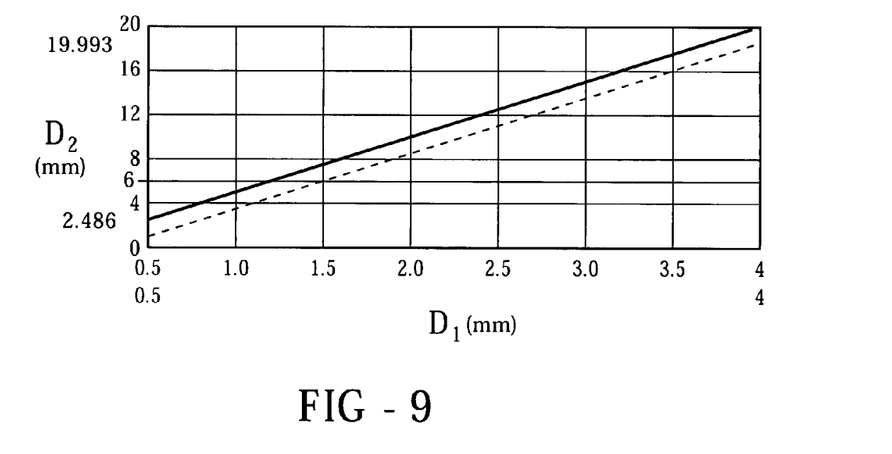
FIG. 9 is a graphical representation of an outer diameter of the stopping member verses the diameter of the recess.

The recess 82 is further defined as a concave shape. The concave shape includes a uniform curvature with the uniform curvature of the recess 82 defining a diameter $D_2$ larger than the outer diameter $D_1$ of the stopping member 78 for providing the single point of contact between the recess 82 and the stopping member 78. The diameter $D_2$ of the recess 82 may be any diameter and preferably falls within the diameters $D_2$ represented on the graph in FIG. 9. In the embodiment illustrated, the diameter $D_2$ of the recess 82 is 6.0 mm. The graph in FIG. 9 represents the outer diameter $D_1$ of the stopping member 78 versus the diameter $D_2$ of the recess 82. In FIG. 9, the solid line represents one possible set of diameters for the outer diameter $D_1$ of the stopping member 78 versus the diameter $D_2$ of the recess 82. Further, the dashed line represents the preferred set of diameters for the outer diameter $D_1$ of the stopping member 78 versus the diameter $D_2$ of the recess 82. The dashed line is parallel to the solid line; therefore, it is to be appreciated that other lines may be added to the graph as long as the other lines are parallel to the solid line. Thus many different outer diameters $D_1$ for the stopping member 78 and diameters $D_2$ of the recess 82 are possible.

The stopping member 78 may be coupled to the recess 82 by utilizing a glue, a grease, and/or any other substance known to those skilled in the art for retaining the stopping member 78 in the recess 82 while manufacturing and assembling the tilt mechanism 36. It is to be appreciated that the bond between the stopping member 78 and the recess 82 is weak and will break during normal usage. This allows the stopping member 78 to roll in the recess 82 when the lever 44 is rotated between the locked position 54 and the unlocked position 56 to prevent greater resistance in moving the handle. It is to be further appreciated that the glue, the grease, and/or the any other substance is optional.

The stopping member 78 is formed of a first material having a Brinell Hardness Number greater than the tilt head 38 and the lever 44 for deforming at least one of the tilt head 38 and the lever 44 without deforming the stopping member 78. For example, the stopping member 78 may be formed of a powdered steel and/or carbon steel. However it is to be appreciated that the stopping member 78 may be formed of any other material or materials as long as the material(s) have a Brinell Hardness Number greater than the tilt head 38 and the lever 44.

Figure 6:
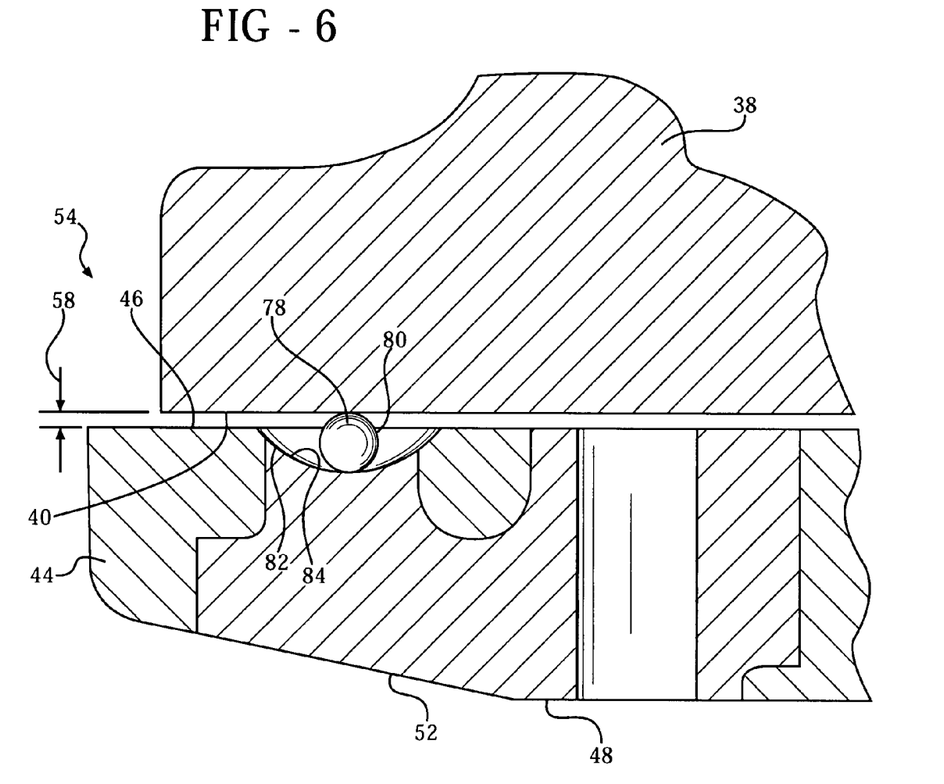
FIG. 6 is a fragmented cross-sectional side view of the tilt head and the lever with the lever defining a recess with a stopping member disposed in the recess before a collision.
Figure 7:
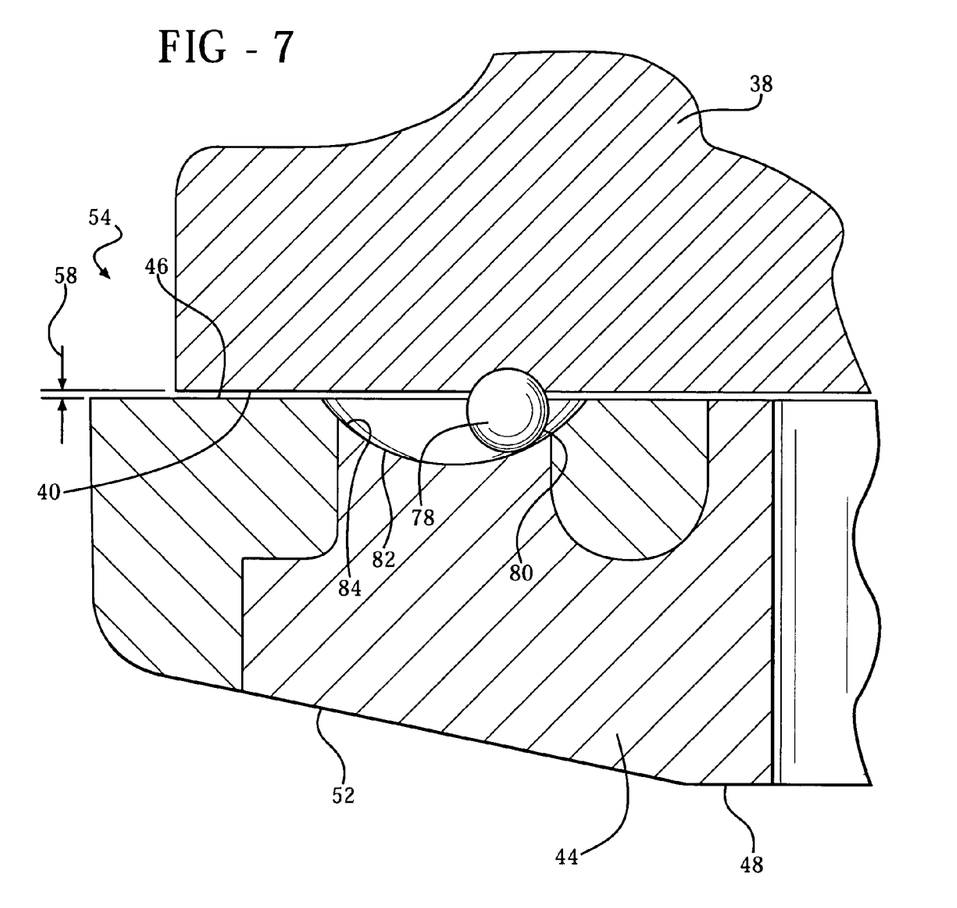
FIG. 7 is a fragmented cross-sectional side view of the tilt head, lever, and stopping member of FIG. 6 after the collision.

At least one of the tilt head 38 and the lever 44 is formed of a second material having a Brinell Hardness Number greater than the other of the lever 44 and the tilt head 38 for retaining the stopping member 78 in the recess 82 while the stopping member 78 deforms at least one of the tilt head 38 and the lever 44. In other words, the second material is strong enough to prevent the recess 82 from deforming while the stopping member 78 deforms at least one of the tilt head 38 and the lever 44. For example, as shown in FIG. 6, if the stopping member 78 is coupled to the lever 44 and deforming the tilt head 38, the lever 44 will be formed of the second material and will have a Brinell Hardness Number greater than the tilt head 38. In another example, as shown in FIG. 8, if the stopping member 78 is coupled to the tilt head 38 and deforming the lever 44, the tilt head 38 will be formed of the second material and will have a Brinell Hardness Number greater than the lever 44. Preferably, the lever 44 is formed of the second material. The lever 44 and the tilt head 38 may be formed of a powdered metal and/or carbon steel. However it is to be appreciated the lever 44 and the tilt head 38 may be formed of any other material or materials as long as one of the lever 44 and the tilt head 38 has a Brinell Hardness Number greater than the other of the lever 44 and the tilt head 38.

To adjust the position of the steering wheel in normal operation, the handle is moved which, in the embodiment shown, pivots the lever 44 about the pivot axis P from the locked position 54 to the unlocked position 56. As the lever 44 rotates about the pivot axis P, the moveable shoe 64 pivots about the shoe axis S due to the force pin 62 pushing the stop arm 74 and the cam lobe 72 moving along the wedge surface 52 of the lever 44. In other words, the cam lobe 72 of the moveable shoe 64 slides along the wedge surface 52 as the wedge surface 52 moves with the lever 44. The teeth 76 of the moveable shoe 64 disengage from the rack of teeth 28 of the support 24 for allowing the tilt head 38 to pivot about the tilt axis T which allows the tilt position of the steering wheel to be changed.

Below is a discussion of a vehicle collision and will assume, for illustration purposes only, that the recess 82 is disposed in the tilt head 38 and the lever 44 will be deformed as shown in FIG. 10. When the vehicle is in the collision, the predetermined force is applied to the steering wheel and the upper shaft 30 which applies an impact force to the tilt head 38 and the moveable shoe 64 with the movable shoe 64 urging the lever 44 to the unlocked position 56. In other words, the impact force causes the tilt head 38 to move axially relative to the outer jacket 22 which urges the teeth 76 of the moveable shoe 64 to move up the inclined rack of teeth 28 on the support 24. This causes the moveable shoe 64 to pivot about the shoe axis S toward the lever 44 which means the cam lobe 72 is applying a force against the wedge surface 52 of the lever 44. The force applied to the wedge surface 52 causes the lever 44 to pivot toward the unlocked position 56 due to an angle of the wedge surface 52. In other words, the cam lobe 72 applies the force to the wedge surface 52 causing the wedge surface 52 to move in a direction of least resistance, which is toward the unlocked position 56.

A reactive force is applied to the impact force through the stopping member 78 by the stopping member 78 deforming at least one of the tilt head 38 and the lever 44. In other words, the reactive force is applied to the impact force through the stopping member 78 by the single point of contact such that the reactive force transfers through the stopping member 78 to deform at least one of the tilt head 38 and the lever 44 for preventing rotation of the lever 44 to the unlocked position 56. In other words, the force applied to the wedge surface 52 of the lever 44 causes the gap 58 between the tilt head 38 and the lever 44 to reduce size which causes the stopping member 78 to deform the lever 44. As the gap 58 reduces size, the stopping member 78 moves along the inner surface 84 of the recess 82 for a short distance while keeping the single point of contact between the recess 82 and the stopping member 78 and deforms the lever 44. The stopping member 78 deforms the lever 44 for preventing the lever 44 from rotating to the unlocked position 56 and for maintaining the moveable shoe 64 in the engaged position 68. In other words, the tilt head 38 is prevented from pivoting about the tilt axis T which prohibits the steering wheel from changing position during the vehicle collision. The stopping member 78 indents, dimples, or divots the material of the lever 44. Meaning no groove is formed in the material. The stopping member 78 allows less than 1% of rotation of the lever 44 for maintaining the moveable shoe 64 in the engaged position 68. However it is to be appreciated that the lever 44 may rotate 1% or more as long as the moveable shoe 64 remains in the engaged position 68.

Referring to FIGS. 11-16, a third, a fourth, and a fifth embodiment of the stopping member 78 is shown, wherein like numerals indicate like or corresponding parts throughout the several views. The primary distinction between the first embodiment and these embodiment is the recess 82 is eliminated and the stopping member 78 is secured to at least one of the lever 44 and the tilt head 38, which eliminates the single point of contact between the stopping member 78 at least one of the lever 44 and the tilt head 38. Preferably, the stopping member 78 is integrally formed with at least one of the lever 44 and the tilt head 38. More specifically, the stopping member 78 is integrally formed with at least one of the top side 46 of the lever 44 and the first surface 40 of the tilt head 38. However, it is to be appreciated that the stopping member 78 may be secured to the bottom side 48 of the lever 44 for deforming the movable shoe 64. It is further to be appreciated that the stopping member 78 may be secured to at least one of the lever 44 and the tilt head 38 by welding, forging, machining, or any other method known to those skilled in the art. In addition, it is to be appreciated that the stopping member 78 may be integrally formed with the insert 50 and the insert 50 may be disposed on at least one of the top side 46, the bottom side 48, and the first surface 40.

Figure 11:
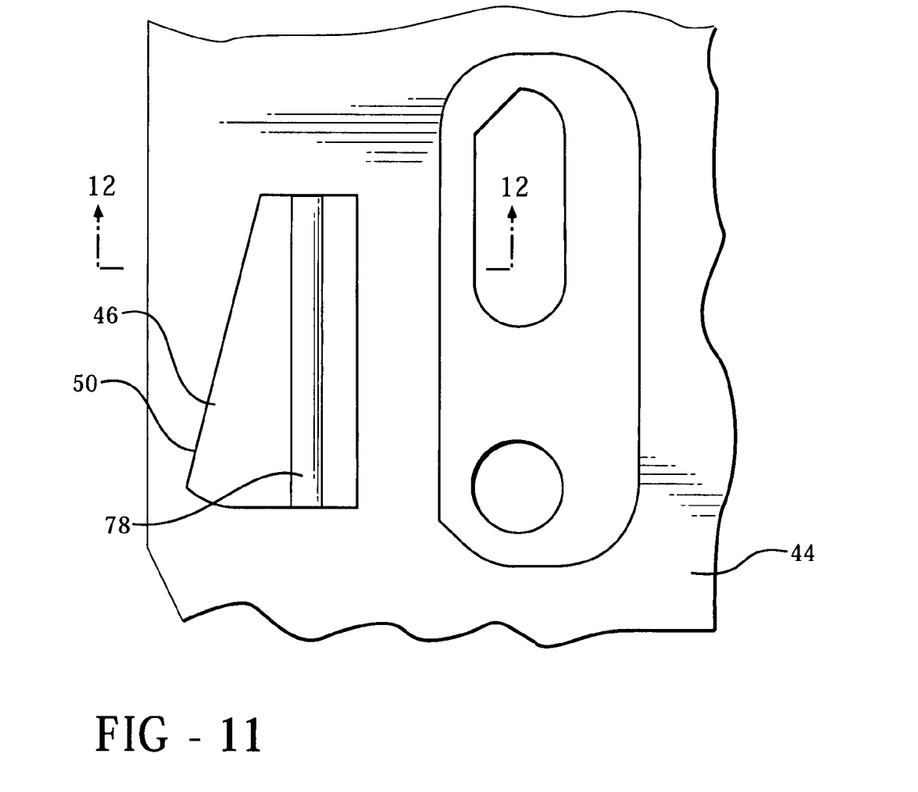
FIG. 11 is a fragmented top view of a third embodiment of the stopping member configured as a ridge and disposed on the top side of the lever.
Figure 12:
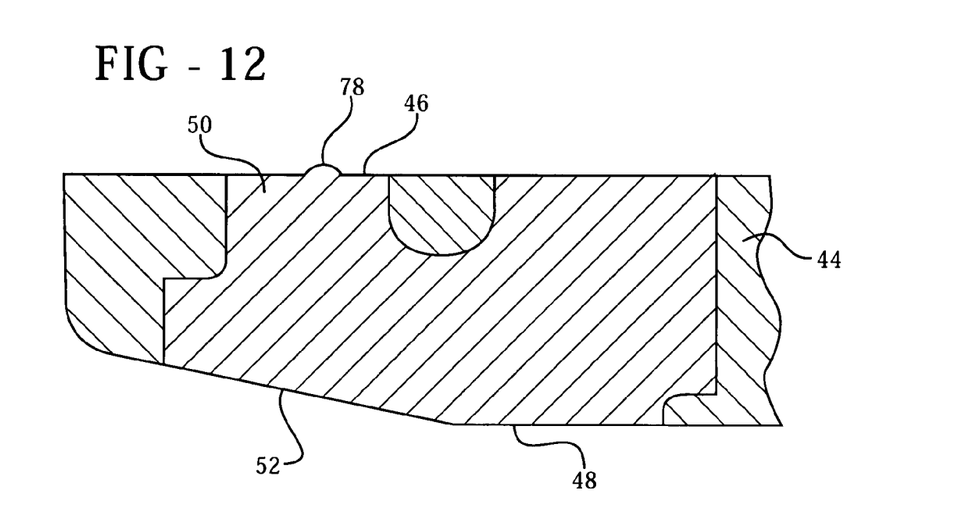
FIG. 12 is a fragmented cross-sectional view of the ridge of FIG. 11.
Figure 13:
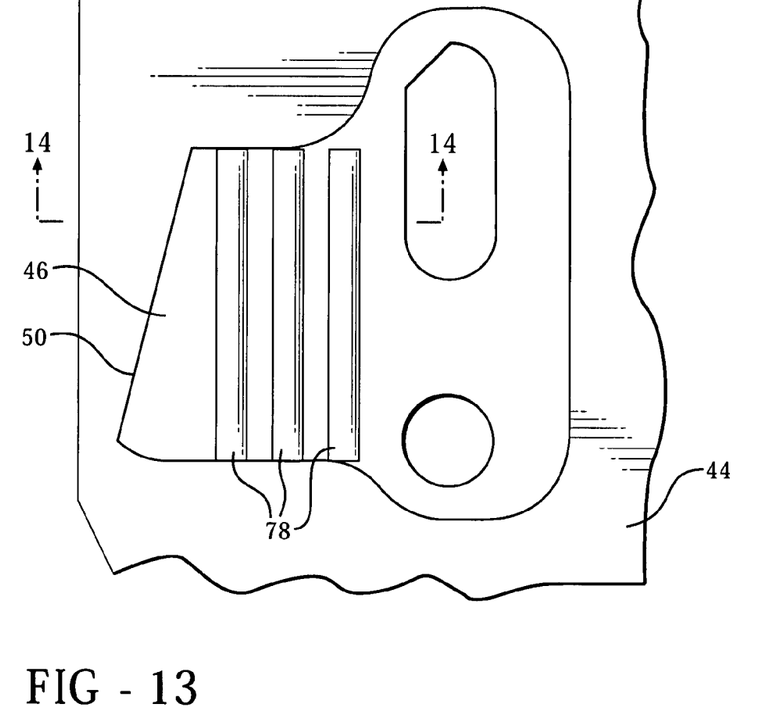
FIG. 13 is a fragmented top view of a fourth embodiment of the stopping member configured as a plurality of ridges and disposed on the top side of the lever.
Figure 14:
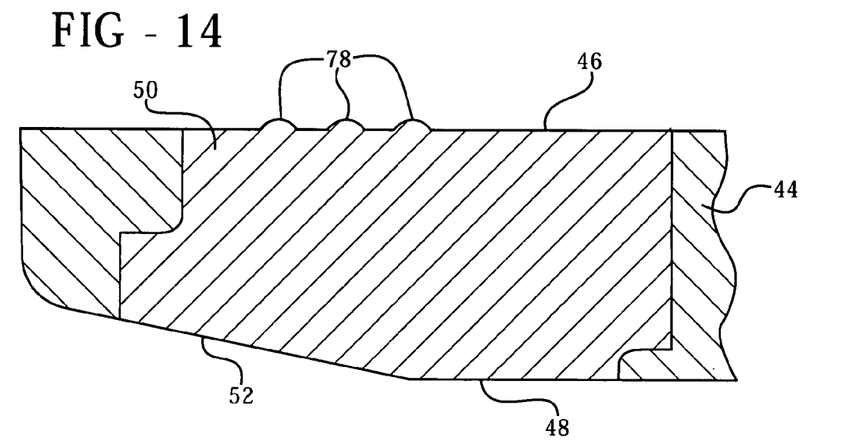
FIG. 14 is a fragmented cross-sectional view of the plurality of ridges of FIG. 13.
Figure 15:
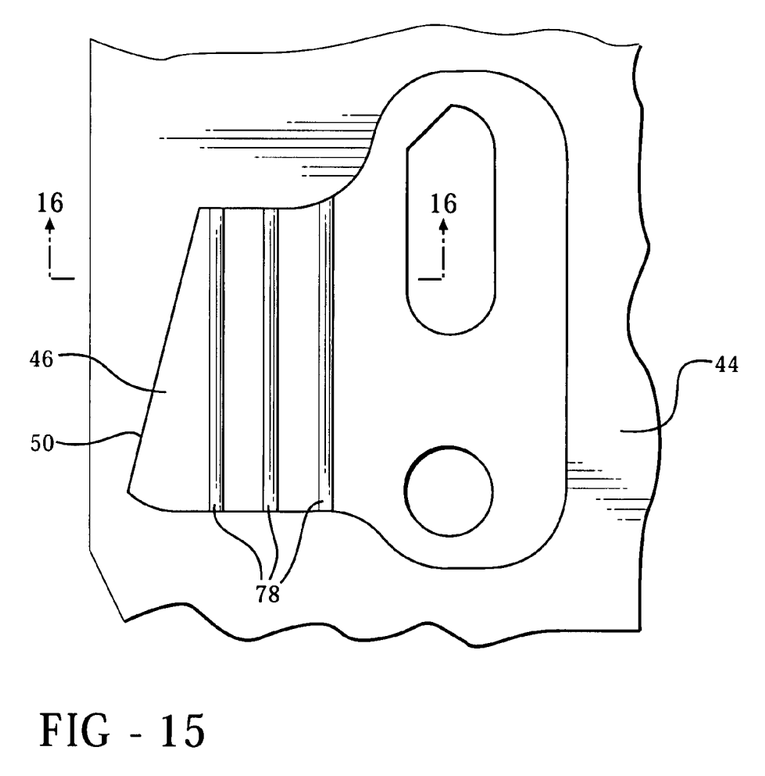
FIG. 15 is a fragmented top view of a fifth embodiment of the stopping member configured as a plurality of serrations and disposed on the top side of the lever.
Figure 16:
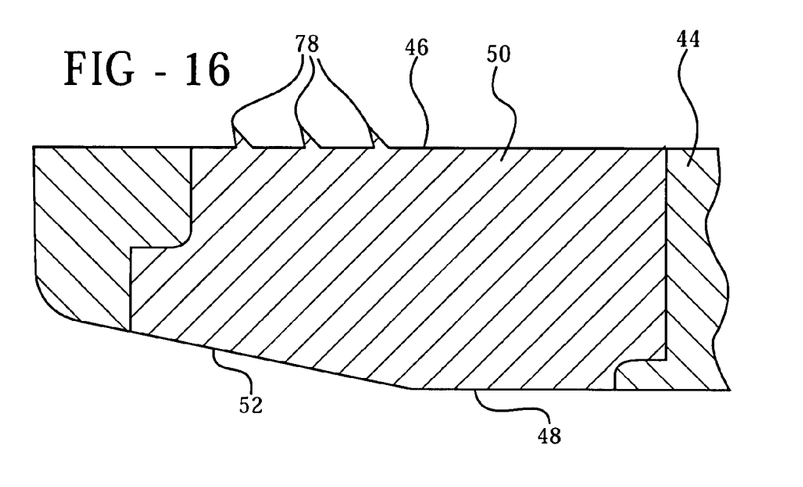
FIG. 16 is a fragmented cross-sectional view of the plurality of serrations of FIG. 15.

The stopping member 78 may be configured as a ridge, a serration, a plurality of ridges, a plurality of serrations, or any other acceptable configuration for preventing rotation of the lever 44 upon the predetermined force applied to the upper shaft 30. For example, in the third embodiment as shown in FIGS. 11 and 12, the stopping member 78 is configured as a ridge. In the fourth embodiment as shown in FIGS. 13 and 14, the stopping member 78 is configured as a plurality of ridges and in the fifth embodiment as shown in FIGS. 15 and 16, the stopping member 78 is configured as a plurality of serrations. It is to be appreciated that each of the ridges and each of the serrations may be elongated for providing larger areas of deformation. However it is to be appreciated that the each of the ridges and each of the serrations may vary in length. Each of the ridges and each of the serrations extend a predetermined distance away from at least one of the top side 46, the bottom side 48, and the first surface 40. The predetermined distance may be from 20 µm to 60 µm. However it is to be appreciated that the predetermined distance may be higher than 60 µm or lower than 20 µm.

Below is a discussion of the vehicle collision and will assume, for illustration purposes only, that the stopping member 78 is disposed on the tilt head 38 and the lever 44 will be deformed. When the vehicle is in the collision, the predetermined force is applied to the steering wheel and the upper shaft 30 which applies the impact force to the tilt head 38 and the moveable shoe 64 with the movable shoe 64 urging the lever 44 to the unlocked position 56. In other words, the impact force causes the tilt head 38 to move axially relative to the outer jacket 22 which urges the teeth 76 of the moveable shoe 64 to move up the inclined rack of teeth 28 on the support 24. This causes the moveable shoe 64 to pivot about the shoe axis S toward the lever 44 which means the cam lobe 72 is applying the force against the wedge surface 52 of the lever 44. The force applied to the wedge surface 52 causes the lever 44 to pivot toward the unlocked position 56 due to the angle of the wedge surface 52. In other words, the cam lobe 72 applies the force to the wedge surface 52 causing the wedge surface 52 to move in a direction of least resistance, which is toward the unlocked position 56.

The reactive force is applied to the impact force through the stopping member 78 by the stopping member 78 deforming at least one of the tilt head 38 and the lever 44. In other words, the reactive force is applied to the impact force through the stopping member 78 by the single point of contact such that the reactive force transfers through the stopping member 78 to deform at least one of the tilt head 38 and the lever 44 for preventing rotation of the lever 44 to the unlocked position 56. The force applied to the wedge surface 52 of the lever 44 causes the gap 58 between the tilt head 38 and the lever 44 to reduce size which causes the stopping member 78 to deform the lever 44. The stopping member 78 deforms the lever 44 for preventing the lever 44 from rotating to the unlocked position 56 and for maintaining the moveable shoe 64 in the engaged position 68. In other words, the tilt head 38 is prevented from pivoting about the tilt axis T which prohibits the steering wheel from changing position during the vehicle collision. The stopping member 78 indents, dimples, or divots the material of the lever 44. Meaning no groove is formed in the material. The stopping member 78 allows less than 1% of rotation of the lever 44 for maintaining the moveable shoe 64 in the engaged position 68. However it is to be appreciated that the lever 44 may rotate 1% or more as long as the moveable shoe 64 remains in the engaged position 68.

The subject invention also provides a method of preventing rotation of the tilt mechanism 36 relative to the steering column during application of the predetermined force. The tilt mechanism 36 includes the tilt head 38, the lever 44, and the moveable shoe 64 pivotally mounted to the tilt head 38. The tilt mechanism 36 further includes the stopping member 78 coupled to at least one of the lever 44 and the tilt head 38. The method includes applying the impact force to the tilt head 38 and the moveable shoe 64 with the moveable shoe 64 urging the lever 44 to the unlocked position 56. The method further includes engaging the lever 44 with the stopping member 78. More specifically, the step of engaging the lever 44 with the stopping member 78 is further defined as engaging the recess 82 with the stopping member 78 through the single point of contact. The method further includes applying the reactive force to the impact force through the stopping member 78 by the stopping member 78 deforming at least one of the tilt head 38 and the lever 44 for preventing rotation of the lever 44 to the unlocked position 56.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A steering column assembly for a vehicle, comprising:
   an outer jacket having a support defining a tilt axis;
   an upper shaft coupled to said outer jacket;
   a tilt head pivotally mounted to said support about said tilt axis and mounted to said upper shaft for coupling said upper shaft to said outer jacket;
   a lever pivotally mounted to said tilt head about a pivot axis;
   a moveable shoe pivotally mounted to said tilt head about a shoe axis and abutting said lever such that rotation of said lever about said pivot axis facilitates rotation of said moveable shoe about said shoe axis between an engaged position engaging said support for preventing rotation of said tilt head and a disengaged position spaced from said support for allowing rotation of said tilt head; and
   a stopping member coupled to at least one of said lever and said tilt head for deforming at least one of said tilt head and said lever to maintain said moveable shoe in said engaged position and to prevent said tilt head from pivoting about said tilt axis upon a predetermined force applied to said upper shaft, at least one of said lever and said tilt head defining a recess having an inner surface with a predetermined width for receiving said stopping member, said stopping member including an outer surface defining a thickness with said width of said recess being larger than said thickness for allowing a single point of contact between said recess and said stopping member.

2. An assembly as set forth in claim 1 wherein said stopping member is formed of a first material having a Brinell Hardness Number greater than said tilt head and said lever for deforming at least one of said tilt head and said lever without deforming said stopping member.

3. An assembly as set forth in claim 1 wherein said lever includes a wedge surface with said moveable shoe abutting said wedge surface and said pivot axis transverse said shoe axis such that rotation of said lever about the pivot axis between a locked position and an unlocked position allows said moveable shoe to pivot about said shoe axis while moving along said wedge surface between said engaged position preventing rotation of said tilt head and said disengaged position allowing rotation of said tilt head.

4. A steering column assembly for a vehicle, comprising:
   an outer jacket having a support defining a tilt axis;
   an upper shaft coupled to said outer jacket;
   a tilt head pivotally mounted to said support about said tilt axis and mounted to said upper shaft for coupling said upper shaft to said outer jacket;
   a lever pivotally mounted to said tilt head about a pivot axis;
   a moveable shoe pivotally mounted to said tilt head about a shoe axis and abutting said lever such that rotation of said lever about said pivot axis facilitates rotation of said moveable shoe about said shoe axis between an engaged position engaging said support for preventing rotation of said tilt head and a disengaged position spaced from said support for allowing rotation of said tilt head; and
   a stopping member coupled to at least one of said lever and said tilt head for deforming at least one of said tilt head and said lever to maintain said moveable shoe in said engaged position and to prevent said tilt head from pivoting about said tilt axis upon a predetermined force applied to said upper shaft, said stopping member including an outer surface defining a thickness with said width of said recess being larger than said thickness for allowing a single point of contact between said recess and said stopping member, said stopping member is further defined as a circular shape with a constant outer diameter.

5. An assembly as set forth in claim 4 wherein said recess is further defined as a concave shape.

6. An assembly as set forth in claim 5 wherein said concave shape includes a uniform curvature with said uniform curvature of said recess defining a diameter larger than said outer diameter of said stopping member.

7. A steering column assembly for a vehicle, comprising:
an outer jacket having a support defining a tilt axis;
an upper shaft coupled to said outer jacket;
a tilt head pivotally mounted to said support about said tilt axis and mounted to said upper shaft for coupling said upper shaft to said outer jacket;
a lever pivotally mounted to said tilt head about a pivot axis;
a moveable shoe pivotally mounted to said tilt head about a shoe axis and abutting said lever such that rotation of said lever about said pivot axis facilitates rotation of said moveable shoe about said shoe axis between an engaged position engaging said support for preventing rotation of said tilt head and a disengaged position spaced from said support for allowing rotation of said tilt head; and
a stopping member coupled to at least one of said lever and said tilt head for deforming at least one of said tilt head and said lever to maintain said moveable shoe in said engaged position and to prevent said tilt head from pivoting about said tilt axis upon a predetermined force applied to said upper shaft, at least one of said lever and said tilt head defines a recess having an inner surface with a predetermined width for receiving said stopping member, said stopping member is formed of a first material having Brinell Hardness Number greater than said tilt head and said lever for deforming at least one of said tilt head and said lever without deforming said stopping member, at least one of said tilt head and said lever is formed of a second material having a Brinell Hardness Number greater than the other of said lever and said tilt head for retaining said stopping member in said recess while said stopping member deforms at least one of said tilt head and said lever.

8. A tilt mechanism for a steering column of a vehicle, comprising:
a tilt head adapted to be pivotally mounted to the steering column for rotation about a tilt axis;
a lever pivotally mounted to said tilt head about a pivot axis;
a moveable shoe pivotally mounted to said tilt head about a shoe axis and abutting said lever such that rotation of said lever about said pivot axis facilitates rotation of said moveable shoe about said shoe axis between an engaged position engaging the steering column for preventing rotation of said tilt head and a disengaged position spaced from the steering column for allowing rotation of said tilt head; and
a stopping member coupled to at least one of said lever and said tilt head for deforming at least one of said tilt head and said lever to maintain said moveable shoe in said engaged position and to prevent said tilt head from pivoting about said tilt axis upon a predetermined force applied to the steering column, at least one of said lever and said tilt head defines a recess having an inner surface with a predetermined width for receiving said stopping member, said stopping member being further defined as a generally circular shape with a constant outer diameter and said recess including a concave shape having a curvature with said curvature of said recess defining a diameter larger than said outer diameter of said stopping member.

9. A mechanism as set forth in claim 8 wherein said concave shape has a uniform curvature.

10. A mechanism as set forth in claim 8 wherein said lever includes a wedge surface with said moveable shoe abutting said wedge surface and said pivot axis transverse said shoe axis such that rotation of said lever about the pivot axis between a locked position and an unlocked position allows said moveable shoe to pivot about said shoe axis along said wedge surface between said engaged position preventing rotation of said tilt head and said disengaged position allowing rotation of said tilt head.

11. A tilt mechanism for a steering column of a vehicle, comprising:
a tilt head adapted to be pivotally mounted to the steering column for rotation about a tilt axis;
a lever pivotally mounted to said tilt head about a pivot axis;
a moveable shoe pivotally mounted to said tilt head about a shoe axis and abutting said lever such that rotation of said lever about said pivot axis facilitates rotation of said moveable shoe about said shoe axis between an engaged position engaging the steering column for preventing rotation of said tilt head and a disengaged position spaced from the steering column for allowing rotation of said tilt head; and
a stopping member coupled to at least one of said lever and said tilt head for deforming at least one of said tilt head and said lever to maintain said moveable shoe in said engaged position and to prevent said tilt head from pivoting about said tilt axis upon a predetermined force applied to the steering column, at least one of said lever and said tilt head defines a recess having an inner surface with a predetermined width for receiving said stopping member, said stopping member includes an outer surface defining a thickness with said width of said recess being larger than said thickness for allowing a single point of contact between said recess and said stopping member.

12. A mechanism as set forth in claim 11 wherein said stopping member is formed of a first material having a Brinell Hardness Number greater than said tilt head and said lever for deforming at least one of said tilt head and said lever without deforming said stopping member.

13. A tilt mechanism for a steering column of a vehicle, comprising:
a tilt head adapted to be pivotally mounted to the steering column for rotation about a tilt axis;
a lever pivotally mounted to said tilt head about a pivot axis;
a moveable shoe pivotally mounted to said tilt head about a shoe axis and abutting said lever such that rotation of said lever about said pivot axis facilitates rotation of said moveable shoe about said shoe axis between an engaged position engaging the steering column for preventing rotation of said tilt head and a disengaged position spaced from the steering column for allowing rotation of said tilt head; and
a stopping member coupled to at least one of said lever and said tilt head for deforming at least one of said tilt head and said lever to maintain said moveable shoe in said engaged position and to prevent said tilt head from pivoting about said tilt axis upon a predetermined force applied to the steering column, at least one of said lever and said tilt head defines a recess having an inner surface with a predetermined width for receiving said stopping member, said stopping member is formed of a first material having a Brinell Hardness Number greater than said tilt head and said lever for deforming at least one of said tilt head and said lever without deforming said stopping member, at least one of said tilt head and said lever is formed of a second material having a Brinell Hardness Number greater than the other of said lever and said tilt head for retaining said stopping member in said recess while said stopping member deforms at least one of said tilt head and said lever.

14. A method of preventing rotation of a tilt mechanism relative to a steering column during application of a predetermined force with the tilt mechanism having a tilt head, a lever, and a moveable shoe pivotally mounted to the tilt head and a stopping member coupled to at least one of the lever and the tilt head, said method comprising:

applying an impact force to the tilt head and the moveable shoe with the moveable shoe urging the lever to an unlocked position;

engaging the lever with the stopping member disposed in a recess of said tilt head that has an inner surface with a predetermined width for receiving said stopping member, said stopping member having an outer surface defining a thickness with said width of said recess being larger than said thickness for allowing a single point of contact between said recess and said stopping member; and applying a reactive force to the impact force through the stopping member by the stopping member deforming at least one of the tilt head and the lever for preventing rotation of the lever to the unlocked position.

\* \* \* \* \*